United States Patent
Matthys et al.

(10) Patent No.: US 7,090,361 B2
(45) Date of Patent: Aug. 15, 2006

(54) BUNDLED LIGHT BASED ALIGNMENT AND MAINTENANCE TOOL FOR PROJECTION SYSTEMS

(75) Inventors: Geert Matthys, Haaltert (BE); Johan Decock, Zwevegem (BE)

(73) Assignee: Barco N.V., Kortrijk (BE)

(*) Notice: Subject to any disclaimer, the term of this patent is extended or adjusted under 35 U.S.C. 154(b) by 61 days.

(21) Appl. No.: 10/662,013

(22) Filed: Sep. 12, 2003

(65) Prior Publication Data

US 2005/0099608 A1    May 12, 2005

Related U.S. Application Data

(60) Provisional application No. 60/421,198, filed on Oct. 24, 2002.

(51) Int. Cl.
*G03B 21/00* (2006.01)
*G03B 21/14* (2006.01)
*G03B 21/26* (2006.01)
*H04N 17/02* (2006.01)
*H04N 3/22* (2006.01)

(52) U.S. Cl. ............. 353/122; 353/30; 353/69; 353/70; 353/94; 348/190; 348/191; 348/806

(58) Field of Classification Search ............ 353/30, 353/69, 94, 31, 70, 119, 122; 348/190, 191, 348/745, 806; 358/139
See application file for complete search history.

(56) References Cited

U.S. PATENT DOCUMENTS

| | | | | |
|---|---|---|---|---|
| 4,533,950 | A | * | 8/1985 | Harshbarger ............ 348/189 |
| 5,231,481 | A | | 7/1993 | Eouzan et al. ............ 358/60 |
| 5,742,698 | A | | 4/1998 | Minami et al. ............ 382/100 |
| 5,847,784 | A | | 12/1998 | Finnila et al. ............ 349/73 |
| 5,969,756 | A | * | 10/1999 | Buckley et al. ............ 348/190 |
| 6,310,650 | B1 | * | 10/2001 | Johnson et al. ............ 348/383 |
| 6,361,171 | B1 | * | 3/2002 | Ejiri et al. ............ 353/69 |
| 6,456,339 | B1 | * | 9/2002 | Surati et al. ............ 348/745 |
| 6,695,451 | B1 | * | 2/2004 | Yamasaki et al. ............ 353/30 |
| 6,982,766 | B1 | * | 1/2006 | George et al. ............ 348/806 |
| 2004/0085256 | A1 | * | 5/2004 | Hereld et al. ............ 345/1.1 |

OTHER PUBLICATIONS

U.S. Appl. No. 10/662,013, scanned p. 1 of specification.*

* cited by examiner

*Primary Examiner*—Melissa Jan Koval
(74) *Attorney, Agent, or Firm*—Barnes & ThornburgLLP

(57) ABSTRACT

The present invention relates to projection systems, more particularly to a method for visualising test pattern grids in such a projection system.

An array of adjustable, directed light sources is described, which is to be used as a test pattern generator for alignment of at least one projector. Each light source is fixed onto a surface from which it is movable with two degrees of freedom, preferably by putting the surface in plastic deformation. This can preferably be done with help of few tooling aids, and by using one hand only.

5 Claims, 3 Drawing Sheets

BUNDLED LIGHT BASED ALIGNMENT AND MAINTENANCE TOOL FOR PROJECTION SYSTEMS

RELATED APPLICATION

This application is the nonprovisional filing of provisional U.S. Application No. 60/421,198, filed Oct. 24, 2002.

TECHNICAL FIELD OF THE INVENTION

The present invention relates to projection systems, more particularly to a method and apparatus for visualising test pattern grids in such a projection system and for apparatus and methods for adjusting projectors using a test pattern.

BACKGROUND OF THE INVENTION

In multi-channel projection displays, such as used for example in simulation environments, externally generated test pattern grids are generally used as references for the mechanical and geometric (electrical) alignment of the many display channels. These test patterns are designed to represent the location of significant landmarks that may be pre-calculated positions, according to the type of screen (flat, curved, front, rear, etc.), eye-points and position of the projectors.

Many solutions exist to visualize the pre-calculated points to guide display alignment: one can mark "invisible" dots using UV-paint, one can use a slide-projector to project these points, one can install small LED's or fiber optic strands in the screen surface for example. None of these solutions is ideal: they can't be used on all types of screens, they require a complicated setup which may include direct access to the screen surface, several are inaccurate and expensive to correct, and many can only be used in a dark environment.

SUMMARY OF THE INVENTION

It is an object of the present invention to provide a method and device for generating a test pattern grid for being used as reference for aligning display channels.

The above objectives are accomplished by a device and method according to the present invention. A test pattern generator is provided for alignment of a projected light from at least one projector onto a screen. The generator comprises a plurality of directed light sources. The directed light sources may be bundled light or a laser light for instance. The test pattern generator preferably has a surface, each light source being moveably fixed on the surface and being adjustably settable such that a direction of light emitted from each light source can be set for directing light from the light source onto the screen. The surface may be provided by a sheet material that may be flat or shaped, e.g. curved. Movement of each light source may put the sheet material into plastic deformation.

Features and advantages of the present invention will become apparent from the following detailed description, taken in conjunction with the accompanying drawings, which illustrate, by way of example, the principles of the invention.

DESCRIPTION OF PREFERRED EMBODIMENTS

Figure 1:
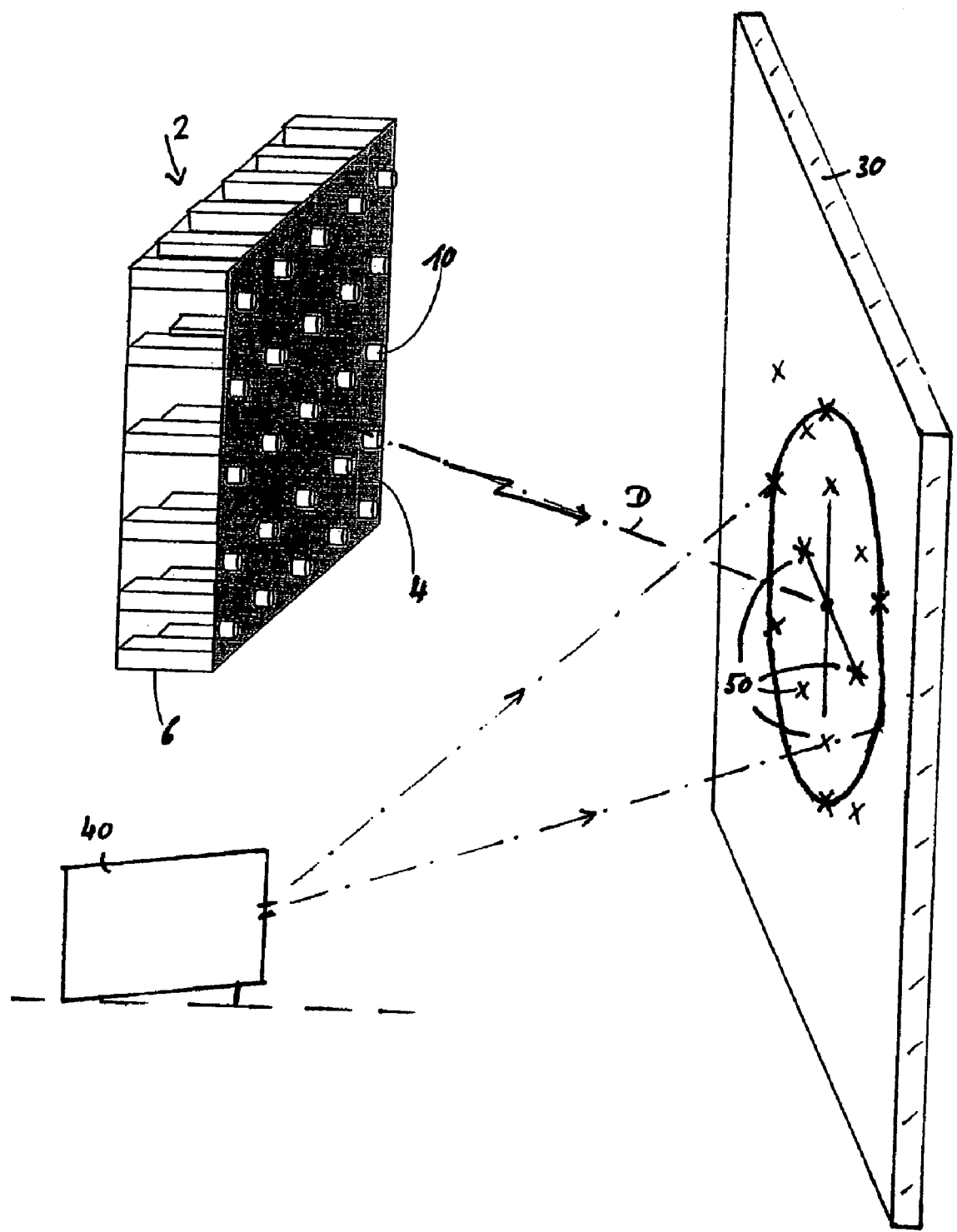
FIG. 1 is an arrangement of a projector, a screen and a device with adjustable directed light sources according to an embodiment of the present invention.

According to FIG. 1 the present invention proposes a method and a device for visualizing pre-calculated points 50 on a display screen 30 for projection, which pre-calculated points are intended to be used for guiding alignment of a projector 40. The method according to the present invention uses an array of directed, e.g. bundled light sources, e.g. solid state lasers or similar directed light sources. Alternatively; a single light source may be used, e.g. a laser, and a light guiding means such as a plurality of optical fibers is used to direct the light towards a screen.

A preferred embodiment is a box-like structure 2, as represented in FIG. 1 comprising a front plate 4 and a back plate 6, which are kept at a distance from each other by distance holders 8. The front plate may be flat or may be shaped, for example to provide easier manipulation of the light sources, e.g. curved if the screen is curved onto which the light is to be directed. The front plate 4 is provided with an array of light source locations for attaching light sources 10. Such locations may for example be holes 12 through which the light sources, such as for example lamps such as lasers, e.g. lasers diodes, are positioned from the back to the front. Alternatively, it may, for example, be places onto which light sources 10 are mounted at the front side, for example by screwing. In that case, preferably holes are provided for passing through power cables, which connect the light sources 10 to a power source (not represented). This later embodiment has the advantage that in case of breakdown of one of the light sources 10, that light source can easily be changed from the front side. In any embodiment according to the present invention, the light sources 10 are fixed, preferably firmly fixed to the front plate 4 by any suitable fixing device but that the direction of directed light emitted from the light sources can be adjusted. Also, after adjustment the direction of the light should be stable, i.e. after adjustment there should be a resistance to any further movement of the light source. Preferably, the light sources should be adjustable by hand, preferably by one hand. The light sources need not be a plurality of lamps. The light could be provided by a single lamp, e.g. a laser light source and the light is split up using a plurality of optical fibers. The end of each optical fiber is moveably fixed to the front plate 4 so that light emitted from the end of the optical fiber can be directed. A suitable lens system to collimate the light beam emitted from the end of each optical fiber may be provided.

Figure 2:
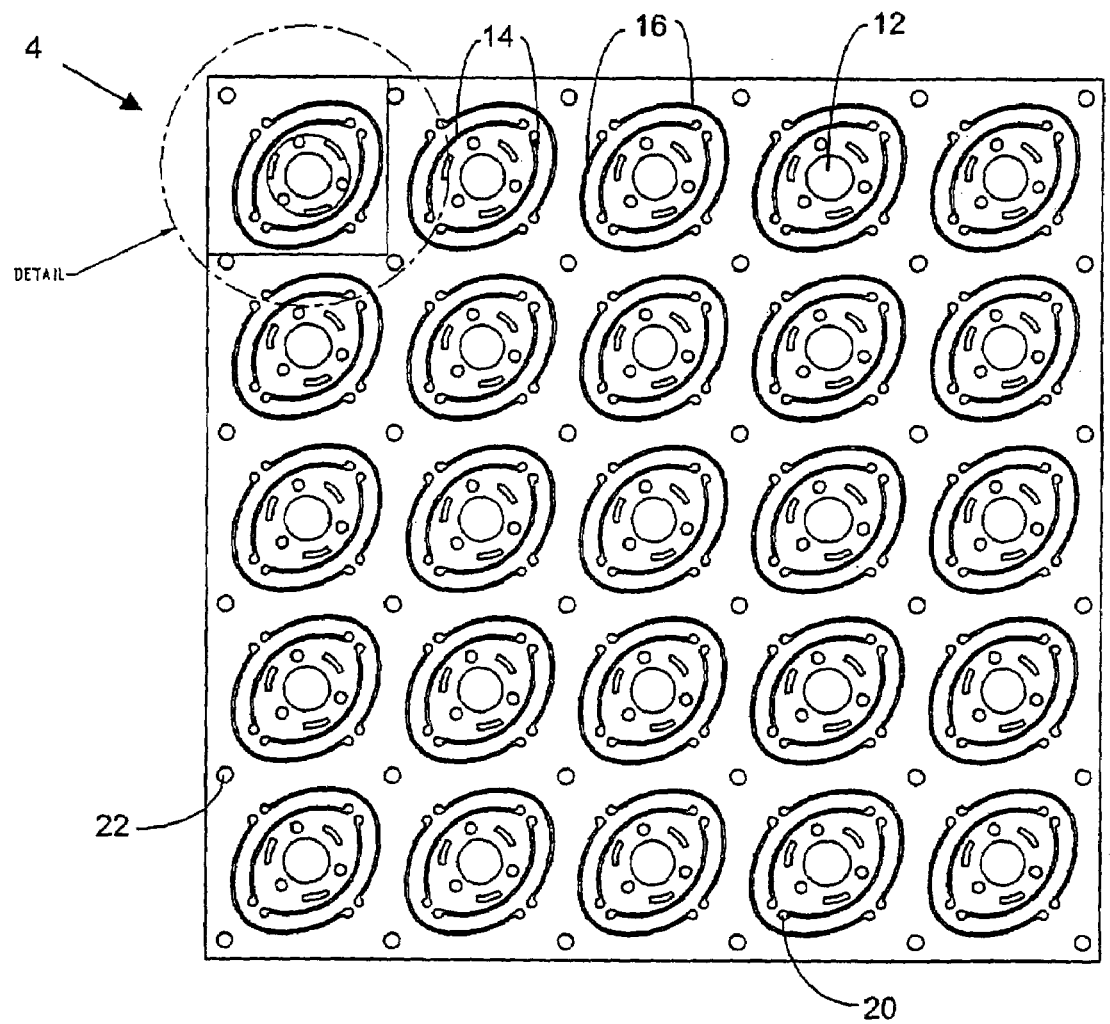
FIG. 2 is a front view of an array of adjustable light sources as in FIG. 1.

The box-like structure may have a sufficient surface area for containing a plurality of such light sources 10. It may, for example, contain a 5×5 matrix (as represented in FIGS. 1 and 2), or a 6×5 matrix of lasers 10. Means are provided to mechanically adjust the light sources 10 to illuminate individual grid positions each independent from the other on a screen. The adjustment preferably allows movement along two directions at an angle to each other, for example two directions orthogonal to each other.

The array of light sources 10 is mounted, preferably by fixing it with its back plate 6 onto a firm surface, for example a wall, a pillar, a stand of a projection device or any other suitable surface. The array of light sources 10 is calibrated using for example a laser theodolite or equivalent device to indicate on a projection display one by one the desired grid points. In order to do this, the laser theodolite needs to be positioned in a well-specified point, for example the eye-point of the operator that will be using the simulator, if the device of the present invention is to be used in a simulation environment. The array of light sources 10, however, does not need to be positioned in a particular place such as at the eye-point, as long as it can project onto the projection display. This facilitates the use of the device of the present invention. Preferably, however, the array of light sources 10 is put at a location where the degree of articulation or movement of the light sources 10 is as small as possible, although this is not critical.

For each desired grid point 50 on the screen 30, one light source of the array is aimed by mechanically adjusting and securing the light source 10 to that position so that it can reproducibly direct light in this direction D. Therefore, a mechanical system is provided in the neighborhood of each light source location to adjust the direction of light emitted from each light source 40.

This system may consist of any system capable of providing movement in two directions at an angle to each other, especially in both azimuth and elevation directions. The movements may be rotations, e.g. rotations in orthogonal directions, for example the light sources may be gimbled. The light sources may be articulated so that movement is provided at joints. The range of movement depends upon the size of the display screen and may typically have a rotational range of +/−30 degrees in both axes. This range of movement may affect the number of arrays or thus the number of box-like structures 2 required for aligning the projection device(s) 40 in a projection system.

Figure 3:
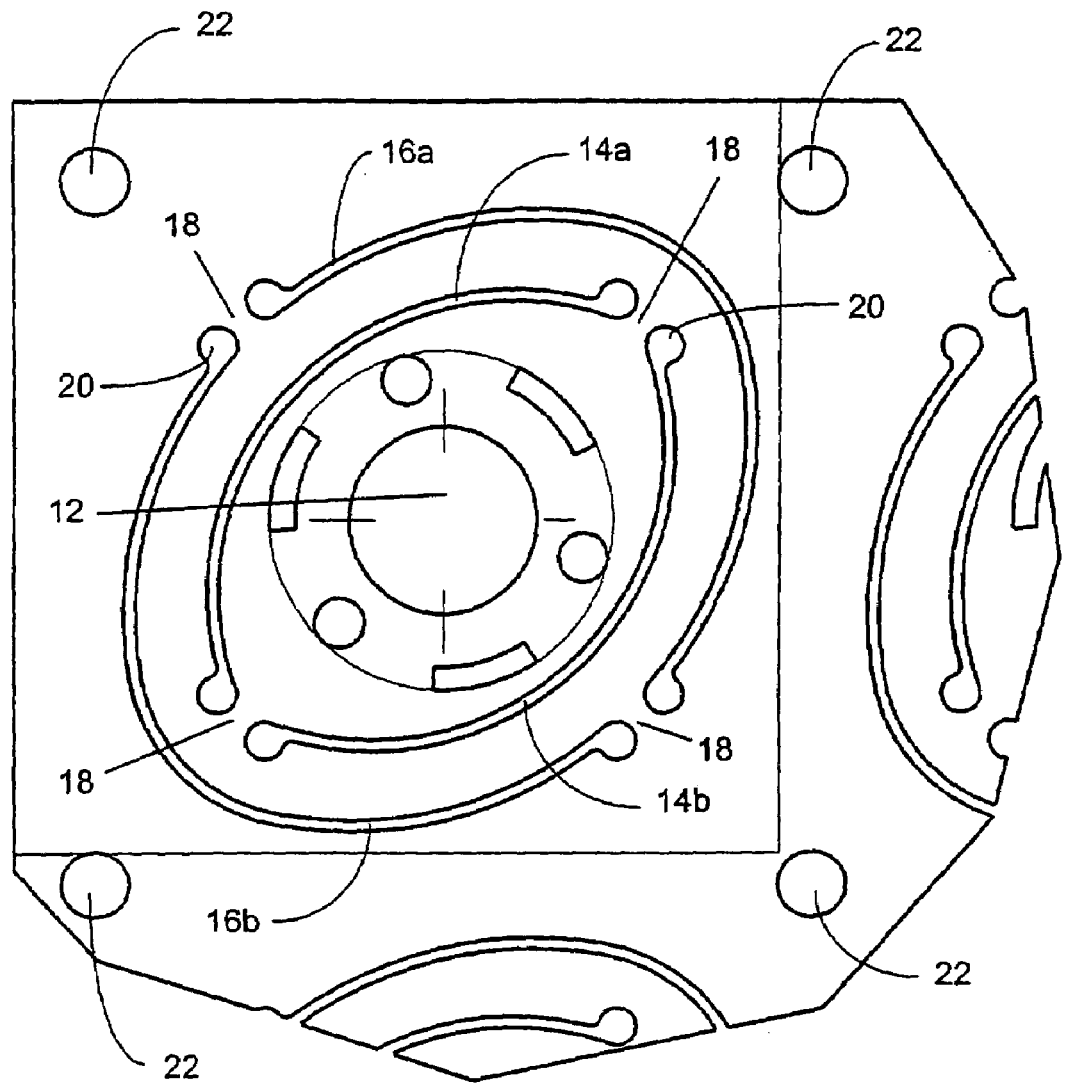
FIG. 3 is an enlarged detail of FIG. 2.

In a preferred embodiment, as represented in FIGS. 2 and 3, the system for adjusting one light source 10 comprises two sets 14, 16 of coaxial elliptical cuts into the front plate 4. The front plate 4 may be made of a sheet metal, especially a metal with a low degree of work hardening such as copper for example. Each set 14, 16 of elliptical cuts consists of two cuts 14a, 16b and 16a, 16b along the edge of an ellipse. The cuts along the edge of an ellipse are incomplete, leaving a pair of short segments of metal 18 at opposite edges of the ellipse. The two pairs of metal segments 18, obtained by the two sets 14 16 of incomplete elliptical cuts, are preferably arranged in such a way that they are equidistant from the center of the ellipses formed by the light source locations, holes 12 in the embodiment represented in FIGS. 2 and 3. An advantage thereof is that equal forces are needed to aim the light source 10 by displacements in equivalent azimuth or elevation directions. Furthermore, the elliptical cuts 14a, 14b, respectively 16a, 16b are preferably symmetrical.

Stress relief cuts 20 may be made at the ends of the cuts 14a, 14b, 16a, 16b to minimize stress concentration and to prevent the short segments 18 of metal from prematurely breaking off, thereby prolonging the life of the light direction adjustment system.

Normally many such sets 14, 16 of cuts are arranged in a pattern, especially a regular pattern on a single sheet metal or front plate 4, forming an array of adjustable light sources.

The light source 10, which is mounted along the axis of the ellipses along the edges of which the cuts are made, is then mechanically moved, whereby the metal segments 18 act as hinges. Metal is generally placed into plastic deformation when the light sources are manipulated. This can be done by providing an adjustment tool, for example consisting of a hollow pipe or tubular structure which fits over the protruding part of a light source 10 which projects from the front plate 4. Light from the light source 10 is projected through the hollow pipe on and is aimed to a desired grid point 50 on a screen 30. This aiming to the desired grid point 50 is obtained by adjusting the direction of the light source 10, i.e. by moving the direction of the light source 10 thus placing the metal segments 18 around the light source 10 in plastic deformation. Moving the adjustment tool fitted over the light source results in moving the light source or thus in adjusting the position of, and direction of the light from the light source. In another embodiment, the light sources 10 can be motorized to ease the alignment procedure.

Preferably, the front plate 4 is firmly fixed to the back plate 6 by means of the distance holders 8, for example by screws through holes 22, so that a movement of one of the light sources 10 in one direction does not influence the position of a neighboring light source 10.

It is an advantage of the present invention that the directional adjustment of the light sources 10 can be carried out with one hand. It is a further advantage of the present invention that few tooling aids are needed for directional adjustment of the light sources. It is a further advantage of the present invention that the light sources are adjustable from the front side, the side located towards the screen and which is easily reachable, which makes the operation a lot easier.

The process of mechanically adjusting a light source 10 is repeated for all light sources 10 in the array. By extension, multiple arrays can be used to mark a complete a multi-channel system. One light source array can be used per display, however, a one-to-one correspondence is not necessary. The number of light sources per array is arbitrary and may be dependent of the physical situation and the complexity of the system; however, 30 seem to be a reasonable value.

Optimizations may be added to facilitate the capture and adjustment of the sources.

Once all arrays are aligned by means of the theodolite or equivalent device, they can be used for the initial and subsequent alignments of the system and as a permanent maintenance tool to verify the alignment of the display system. Therefore, a drive-box may be included to control the on/off function of the lasers.

If an array of 6×5 light sources 10 is provided, for example a 5×5 subarray of light sources 10 may be used for a normal alignment, as described above. The remaining 5 light sources 10 may be used for indicating the outline and centre point of a non-aligned projector 40. This may be helpful in case of break-down of a projector, when a projector 40 has to be replaced by another one. In principle, if the warp parameters of the first projector, which are the parameters which refer to the alignment of the projector so as to give a desired output image, are read into the new projector 40, projection of images should be correct if the new projector is mechanically located at the same position as the previous projector. With the 5 remaining light sources, it can be checked whether the new projector 40 is really in the correct place. If not, the new projector 40 may first be adjusted so that its centre point and outline fall at the same locations as the centre point and outline of the previous projector. After this, the alignment with the 5×5 array can be carried out.

In another embodiment of this device, the light sources 10 may be configured such that combinations of lights may be enabled or disabled. For example, it may be possible to individually turn on the center light, the corner lights, or other combination of lights to aid in the alignment process. A controller unit may be provided for this purpose.

Once all light sources are set, the light emitted from each light source generates a discrete image component, or a light area, on the screen. As each light source is individually movable, the position of each individual image component or light area is individually settable. The discrete image components form a test pattern.

At least one projector 40 is then adjusted using the generated test pattern 50 comprising the plurality of individual image components. The type of projector 40 used is not a limitation on the present invention, e.g. it may be a CRT projector, an LCD projector, DMD or similar. Also the input to the projector may be analog or digital video signals. Adjustments to the projector 40 which may be carried out may comprise the following: convergence, geometry, adjacent geometry and overlapping geometry.

Adjustment of the convergence means that the different colours that are projected onto the screen 30 are aligned with each other.

When adjusting the geometry it can be investigated, inter alia, whether or not the projected straight lines exhibit a degree of curvature ('bow' or 'pin') and whether or not lines which should be horizontal or vertical on the screen 30 have a degree of slope ('skew' or 'key').

Adjustment of the adjacent geometry is the adjustment of the geometry of pictures which are projected adjacent to each other by two projectors 40 (perhaps with a small overlapping zone in which soft edge is adjusted).

Overlapping geometry adjustment is the adjustment of the geometry of pictures projected on top of one another via two projectors.

While a particular form of the invention has been illustrated and described, it will be apparent that various modifications can be made without departing from the spirit and scope of the invention.

It is to be understood that although specific constructions and configurations, as well as materials, have been discussed herein for devices according to the present invention, deviations can be made therein without departing from the spirit and scope of the present invention. For example, instead of elliptical cuts, circular cuts may be made to form the adjustment device. A disadvantage of this embodiment is that it is not possible to put the hinges for the two directions at the same distance from the centre, so that an operator gets a different feeling for adjusting in one direction or in the other. Furthermore, any material that does not work harden can be used, such as for example copper, copper alloys, aluminium, etc. Combinations of metal and other materials may be used, e.g. metal and plastic. All plastic adjustment devices may be used, e.g. long-life hinges can be made from polypropylene.

What is claimed is:

1. A test pattern generator for alignment of a projected light from at least one projector onto a screen, comprising:
   a plurality of directed light sources, the test pattern generator having a surface, each light source being moveable fixed on the surface and being individually adjustably settable such that a direction of light emitted from each light source can be set for directing light from the light source onto the screen, so that a test pattern is obtained on the screen composed of one or more pre-calculated points.

2. The test pattern generator of claim 1, wherein the surface is provided by a shed material and movement of each light source puts the sheet material into plastic deformation.

3. The test pattern generator according to claim 2, wherein the sheet material is made from a material which does not work harden.

4. A method of adjusting directed light sources for generating a test pattern for alignment of a projected light from at least one projector onto a screen, the light sources being mounted on a surface, the method comprising moving the light source in at least two different directions to thereby set the direction of light emitted from each light source individually so that a test pattern is obtained on the screen composed of one or more pre-calculated points.

5. A method for aligning a projector, comprising projecting onto a screen a test pattern comprising a plurality of discrete image components, the position of each image component being individually adjustably settable so that the test pattern obtained on the screen is composed of one or more pre-calculated points, and adjusting at least one projector with respect, to at least one of convergence, geometry, adjacent geometry and overlapping geometry using the test pattern.

* * * * *